United States Patent [19]

Ariyoshi

[11] Patent Number: 4,869,127
[45] Date of Patent: Sep. 26, 1989

[54] RELATIVE ROTATION TRANSMITTING APPARATUS

[75] Inventor: Yukihiko Ariyoshi, Yamaguchi, Japan

[73] Assignee: Kabushikigaisha Ariyoshikikoushuudan, Yamaguchi, Japan

[21] Appl. No.: 172,552

[22] Filed: Mar. 24, 1988

[30] Foreign Application Priority Data

Mar. 26, 1987 [JP] Japan .................. 62-70211

[51] Int. Cl.$^4$ .............. F16H 37/06; B23B 41/06
[52] U.S. Cl. ................. 74/675; 74/665 B; 82/1.2; 82/1.4
[58] Field of Search ............ 74/675, 626, 665 B; 82/1.2, 1.4

[56] References Cited

U.S. PATENT DOCUMENTS

| | | | |
|---|---|---|---|
| 1,355,700 | 10/1920 | Salminen | 82/1.4 |
| 1,395,735 | 11/1921 | Sawyer | 74/675 X |
| 2,227,801 | 1/1941 | Trofimov | 74/675 |
| 2,334,074 | 11/1943 | Coy | 74/675 |
| 2,940,337 | 6/1960 | Kalb | 74/675 |
| 4,742,738 | 5/1988 | Strand | 82/1.4 X |
| 4,773,290 | 9/1988 | Iwata et al. | 82/1.2 |

Primary Examiner—Allan D. Herrmann
Attorney, Agent, or Firm—Birch, Stewart, Kolasch & Birch

[57] ABSTRACT

Disclosed is a relative rotation transmitting apparatus comprising outer and inner coaxial shafts, main and sub drives, speed-reduction unit operatively connected both to the telescoped shafts and the main and sub drives with associated gear wheels, and a tool-carrier fixed to the fore-end of the outer shaft and having means for converting the rotation of the inner shaft about the longitudinal axis to the rotation about an axis perpendicular to the longitudinal axis and means for converting the rotation about the perpendicular axis to the linear feeding of a tool along the perpendicular axis, thereby permitting the tool to rotate and move radially.

3 Claims, 3 Drawing Sheets

RELATIVE ROTATION TRANSMITTING APPARATUS

BACKGROUND OF THE INVENTION

1. Field of the Invention

The present invention relates to an apparatus for combining rotations of outer and inner coaxial shafts driven by independent external power drives and permitting the inner shaft to rotate at a contorolled speed. A relative rotation transmitting apparatus according to the present invention may be applied to a boring machine. Then, a boring tool is fixed to the ends of the outer and inner shafts, thereby permitting the tool to rotate and radially move relative to a workpiece.

2. Description of the Prior Art

A conventional boring machine uses a differential gear to transmit driving power from an exterior power drive and rotate an inner shaft within a rotating coaxial outer shaft.

Such power transmission using a differential gear is, in fact, difficult in design because many designing factors must be satisfied.

Differential gears are complicated in structure, and are expensive. They are not appropriate to the precision feeding of a member while rotating at a high speed. Only a large-sized boring machine can use a differential gear in its power transmission.

A small-sized boring machine uses cam-and-link mechanisms in place of a differential gear. Specifically, an elongated rod is inserted in a hollow rotating shaft, and cam-and-link mechanisms are connected both to the elongated rod and the rotating shaft to convert the rotation of the shaft to the linear feeding motion of the elongated rod. The linear feeding motion, however, is limited to a relatively short stroke. Also, disadvantageously the elongated rod is flexible, and it will yieldingly bend when pushed against a stationary workpiece. Therefore it cannot feed a boring tool with high precision.

SUMMARY OF THE INVENTION

One object of present invention is to provide a relative rotation transmitting apparatus which is simple in structure, and can be mounted on a support, such as the one on which a main shaft is mounted in a boring machine. Advantageously, the relative rotation transmitting apparatus can be mounted on the rear end of the main shaft support, leaving an open space behind the rear end of the main shaft, thus permitting installation of an extra apparatus such as a tool attaching-and-removing drive or a pneumatic or liqid supply. A differential gear must be designed to fit on a particular shape of a main shaft support, and therefore it lacks adaptability, and is not economical. The differential gear is usually mounted to the fore-end of the main shaft support, thereby leaving an open space in the vicinity of the rear end of the main shaft support. As a result the existence of the differential gear at the fore-end of the main shaft support causes hindrance to boring and maintenance work.

Another object of the present invention is to provide a relative rotation transmitting apparatus having no parts moving or rotating at a multiplying speed, compared with the rotating speed of the main shaft. Thus, the apparatus can endure even if the main shaft is rotated at an increased speed.

Still another object of the present invention is to provide a relative rotation transmitting apparatus which is capable of moving a member such as a tool-carrier, in a direction perpendicular to the longitudinal feeding direction with high precision.

In certain machinings such as boring, radial tool-feeding stroke is short, compared with longitudinal tool-feeding stroke, but the radial tool-feeding requires even more precise control than the longitudinal tool-feeding. Such precise control can be attained easily when the radial tool-feeding is effected through the agency of a speed-reduction unit from a driving power source. Then, a small power drive can be used for feeding a tool.

To attain these objects a relative rotation transmitting apparatus according to the present invention comprises: a main shaft drive; a hollow main shaft connected to and driven by the main shaft drive, the main shaft having a gear wheel fixed thereto; a sub-shaft contained in the hollow space of the main shaft in the coaxial relationship, and having a gear wheel fixed thereto; a power-output shaft drive; and a speed reduction unit having power-input and power-output shafts alligned with each oher on the common axis, the power-output shaft being connected to the power-output shaft drive, and having a gear wheel fixed thereto, the speed reduction unit having a gear wheel fixed to its housing, and being rotatable about the common axis of the power-input and power-output shafts, and the gear wheel of the speed reduction unit housing meshing with the gear wheel of the main shaft, and the gear wheel of the power-output shaft meshing with the gear wheel of the sub-shaft; the tooth number Z1, the tooth number Z2 of the speed reduction unit housing gear wheel, the tooth number Z3 of the power-output shaft gear wheel, and the tooth number Z4 of the sub-shaft gear wheel being determined to satisfy the following equation:

$$Z1/Z2 \times (1 - 1/e) \times Z3/Z4 = 1,$$

where 1/e stands for the ratio of speed reduction (number of the rotations of the power-output shaft/number of rotations of the power-input shaft).

A relative rotation transmitting apparatus according to the present invention further comprises a tool-carrier fixed to the end of the sub-shaft, the tool carrier having means for converting rotation about the longitudinal axis to rotation about an axis perpendicular to the longitudinal axis, and means for converting rotation about the perpendicular axis to linear move, thereby permitting a tool to move perpendicular to the longitudinal axis when the sub-shaft rotates. Then, the number of rotation N2 of the sub-shaft is given by: $N2 = N1 + m (-1/e) \times Z3/Z4$, where N1 stands for the number of rotation of the main shaft, and m stands for the number of rotation of the power-output shaft drive.

BRIEF DESCRIPTION OF THE DRAWINGS

Other objects and advantages of the present invention will be understood from the following description of a relative rotation transmitting apparatus according to preferred embodiments of the present invention, which are show in accompanying drawings.

DETAILED DESCRIPTION OF THE PREFERRED EMBODIMENTS

Figure 1:
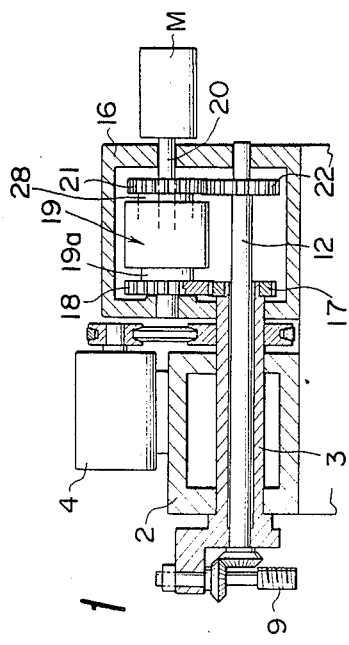
FIG. 1 shows schematically a boring machine to which a relative rotation transmitting apparatus according to one embodiment of the present invention is applied.

FIG. 1 shows schematically the structure of a relative rotary transmission apparatus according to one embodiment of the present invention. As shown in this drawing, the transmission includes a hollow main shaft 3 and a sub-shaft 12, which extends in the longitudinal hollow space of the main shaft 3. If the main shaft 3 rotates at a given rotating speed, then the sub-shaft 12 rotates at a rotating speed which is determined by adding to or subtracting a predetermined rotating speed from the rotating speed of the main shaft 3, as later described in detail.

A speed reduction unit 19 connects the main shaft 3 to the sub-shaft 12 with associated gear wheels 17, 18, 21 and 22 to permit the sub-shaft 12 at a desired rotating speed. Its housing 19a has power-input and output shafts 20 and 28 aligned on a common axis, and the housing 19a is rotatably supported to rotate about the commmo axis.

As shown, a speed-reduction gear wheel 18 is fixed to the housing 19a, whereas a power-output gear wheel 21 is fixed to the power-output shaft 21. The speed-reduction gear wheel 18 is engaged with a main-shaft gear wheel 17, which is fixed to the main shaft 3. The power output gear wheel 21 is engaged with a sub-shaft gear wheel 22, which is fixed to the sub-shaft 22.

The number Z1 of gear teeth of the main-shaft gear wheel 17, the number Z2 of gear teeth of the speed-reduction gear wheel 18, the number Z3 of gear teeth of the output gear wheel 21, and the number Z4 of gear teeth of the sub-shaft 22 are determined to satisfy the following equation:

$$\frac{Z1}{Z2} \times \left(1 - \frac{1}{e}\right) \times \frac{Z3}{Z4} = 1,$$

where 1/e stands for the ratio of speed reduction (rotating speed of the power-output shaft 28/rotating speed of the power-input shaft 20).

A main drive 4 is connected to the main shaft 3, and a sub-drive M is connected to the power-input shaft 20 of the speed reduction unit 19. Assume that the main shaft 3 rotates N1 turns, and that the power-input shaft 20 rotates m turns. Then, the number of rotations N2 of the sub-shaft 12 is given by:

$$N2 = N1 + m(-1/e) \times Z3/Z4$$

As is apparent from the equation, the sub-shaft 12 rotates N2 turns, which turns are determined by adding to the number of rotations N1 of the main shaft 3, a fixed number of rotations, which depends on the number of rotations m of the power-input shaft 20, driven by the sub-drive M, and then, a tool-carrier associated with the sub-shaft 12, will travel a distance which is a direct function of the number of rotation N2 of the subshaft 12.

Figure 2:
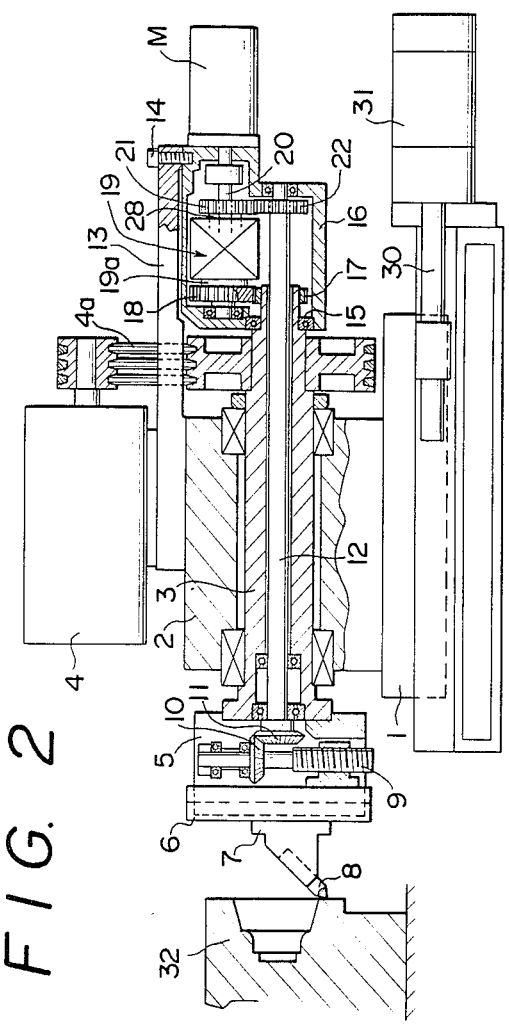
FIG. 2 is a longitudinal section of the boring machine of FIG. 1.

FIG. 2 shows an application of such a relative rotary transmission apparatus to a boring machine. In the drawing a sliding carrier 1 bears a main-shaft support 2.

The hollow main shaft 3 is rotatably fixed to the main-shaft support 2, and is connected to the main-shaft drive motor 4 by pulley and belts 4a. The sliding carrier 1 is threadedly engaged with a thread rod 30, and the thread rod 30 is connected to a feed motor 31. Thus, the clockwise and anticlockwise rotation of the thread rod 30 will cause the sliding carrier 1 to move back and forth in the longitudinal direction.

A tool-carrier 5 is attached to the front end of the main shaft 3. It has a slidable piece 6 movable perpendicularly to the longitudinal axis of the main shaft 3. A tool holder 7 is fixed to the slidable piece 6, and a boring tool 8 is fixed to the tool holder 7. The slidable piece 6 is threadedly engaged with a thread rod 9. The thread rod 9 includes a bevel wheel 10 meshing with a counter bevel wheel 11. The bevel wheel 11 is fixed to the fore end of a sub-shaft 12, extending in the hollow space of the main shaft 3.

A differential gear 16 is fixed to the rear extension 13 of the main-shaft support 2 with bolts 14. The rear end of the main shaft 3 is inserted in the differential gear housing, and is rotatably supported by bearing 15.

An NC servo motor M is fixed to the differential gear housing. The NC servo motor M is adapted to move the slidable piece 6 via the differential gear 16, the sub-shaft 12 and the bevel wheel-and-thread rod assembly 9, 10 and 11.

As shown in FIG. 1, the differential gear 16 has a gear-reduction unit 19 rotatably fixed to its housing, and the gear-reduction unit 19 has a speed reduction gear wheel 18 fixed thereto. The reduction gear wheel 18 meshes with a main-shaft gear wheel 17 which is fixed to the rear end of the main shaft 3. Power-input and output shafts 20 and 28 are alligned on a common axis about which the gear-reduction unit 19 rotates. The output gear wheel 21 meshes with the sub-shaft gear wheel 22. The teeth number Z1 of the gear wheel 17, the teeth number Z2 of the gear wheel 18, the teeth number Z3 of the gear wheel 21 and the teeth number Z4 of the gear wheel 22 are determined so as to satisfy the following equation:

$$Z1/Z2 \times (1 - 1/e) \times Z4/Z3 = 1$$

The sign of "e" is positive in case that the power-input and output gear wheels 20 and 21 rotate in the same direction, and the sign of "e" is negative in case that the power-input and output gear wheels 20 and 21 rotate in opposite directions.

Figure 3:
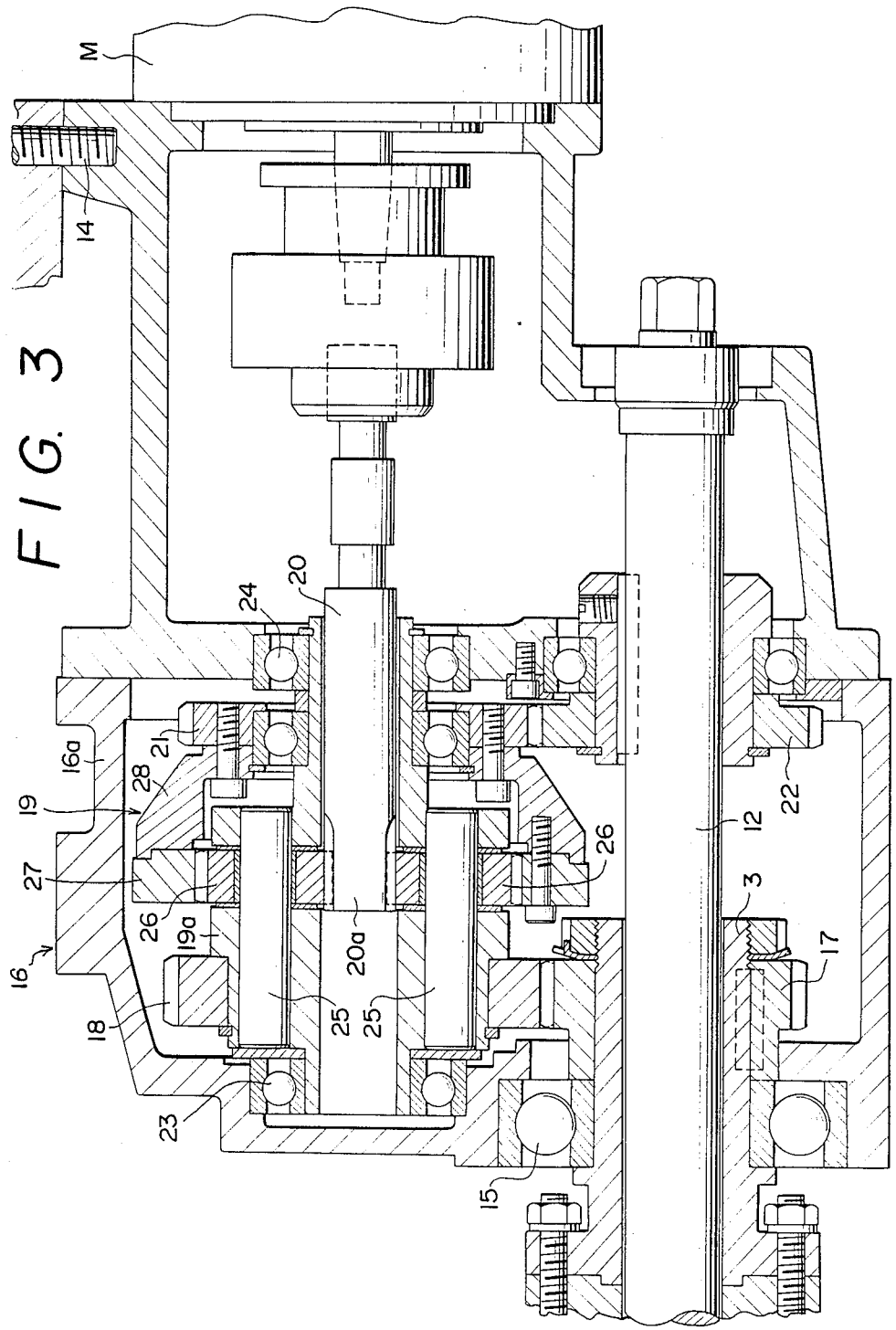
FIG. 3 is an enlarged section of the essential part of the relative rotation transmitting apparatus.
Figure 4:
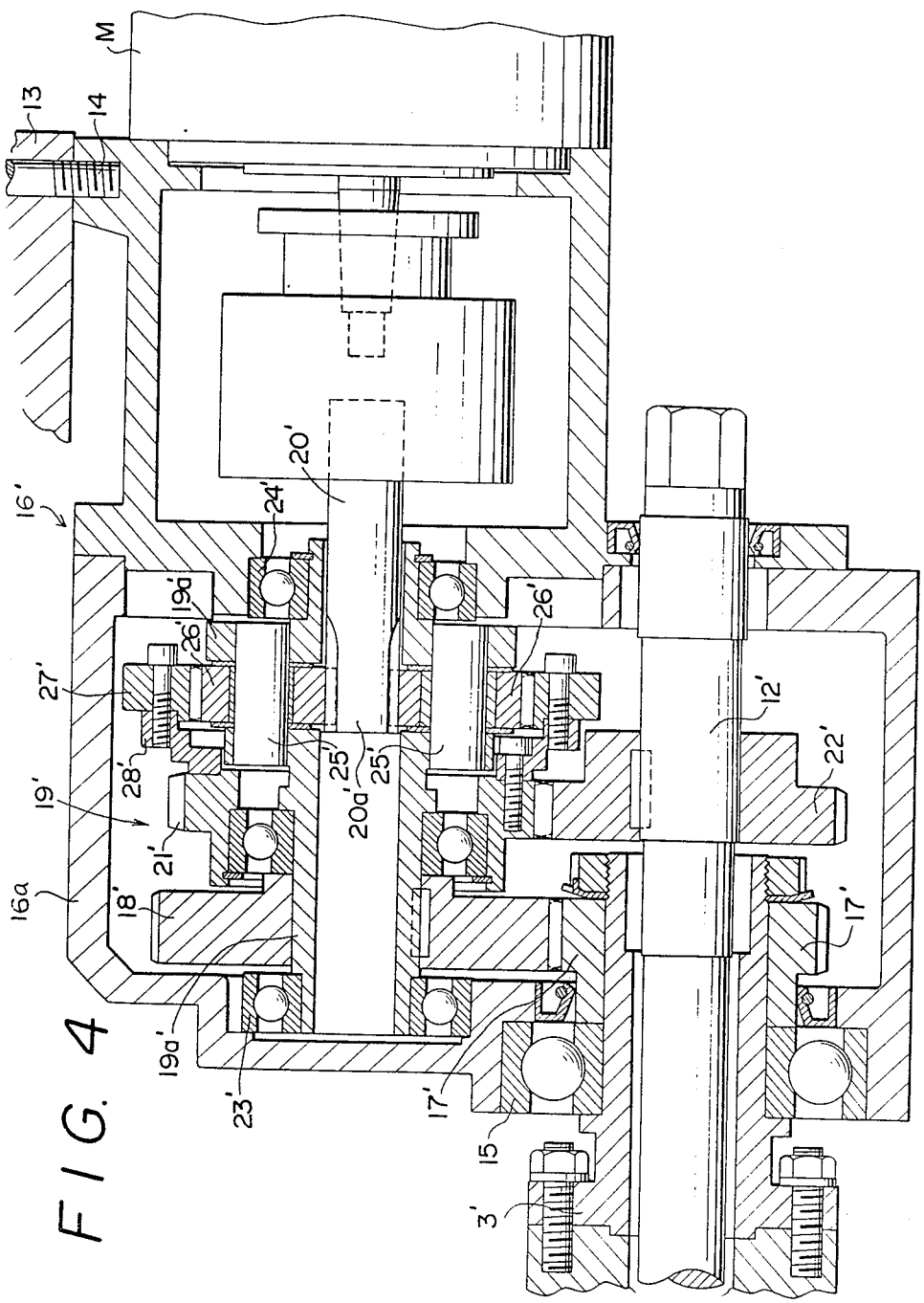
FIG. 4 is a similar enlarged section, showing the essential part of another relative rotation transmitting apparatus.

Any type gear-reduction unit many be used, provided that it has power-input and output shafts on a common axis. FIGS. 3 and 4 show different gear reduction units 19. In these drawings the same parts are indicated by same reference numerals together with a prime designation for the reference numerals in FIG. 4.

Referring to FIG. 3, the essential part 19a of the gear-reduction unit 19 is rotatably supported by bearings 23 and 24, which are fixed to the housing of the differential gear 16. The speed reduction gear wheel 18 of the essential part 19a meshes with the main-shaft gear wheel 17. Thus, the rotation of the main-shaft 3 will cause the essential part 19a to rotate in the differential gear housing.

The essential part 19a has three axles 25 arranged 120 degrees apart from each other, and an intermediate gear wheel 26 turns about each axle 25. The three intermediate gear wheels 26 mesh with a pinion 20a, which is formed at the end of the power-output shaft 20. Also, the intermediate gear wheels 26 mesh with an annular gear wheel 27, which has teeth formed on its inside surface. The inner-toothed gear ring 27 is fixed to the power-output shaft 28, and the power-output shaft 28 has a gear wheel 21 fixed thereto. The main-shaft 3 is hollow and includes a sub-shaft 12 extending in the longitudinal hollow space. A gear 22 is affixed to the sub-shaft 12.

Referring to FIG. 4, the essential part $19a'$ of the gear-reduction unit $19'$ is rotatably supported by bearings $23'$ and $24'$, which are fixed to the housing of the differential gear $16'$. The speed reduction gear wheel $18'$ of the essential part $19a'$ meshes with the main-shaft gear wheel $17'$. Thus, the rotation of the main-shaft $3'$ will cause the essential part $19a'$ to rotate in the differential gear housing. The main-shaft $3'$ is hollow and includes a sub-shaft $12'$ extending in the longitudinal hollow space. A gear $22'$ is affixed to the sub-shaft $12'$.

The essential part $19a'$ has three axles $25'$ arranged 120 degrees apart from each other, and an intermediate gear wheel $26'$ turns about each axle $25'$. The three intermediate gear wheels $26'$ mesh with a pinion $20a'$, which is formed at the end of the power-output shaft $20'$. Also, the intermediate gear wheels $26'$ mesh with an annular gear wheel $27'$, which has teeth formed on its inside surface. The inner-toothed gear ring $27'$ is fixed to the power-output shaft $28'$, and the power-output shaft $28'$ has a gear wheel $21'$ fixed thereto.

The gear reduction unit 19 operates as follows:

Assume that the speed reduction gear wheel 18 is rotated while the power-input shaft 20 is kept stationary. Then, the gear wheel 21 of the power-output shaft 28 will rotate at a rate of $(1+Z5/Z7)$ in the same direction as the speed reduction gear wheel 18, wherein (Z5 stands for the tooth number of the pinion $20a$; Z6 stands for the tooth number of the intermediate gear wheel; and Z7 stands for the tooth number of the inner-toothed ring 27. In short, the speed of the gear wheel 21 is increased by Z5/Z7. This can be expressed in terms of speed-reduction ratio 1/e as follows:

$$Z5/Z7 = -1/e$$

Thus, the number of rotations of the gear wheel 21 of the power-output shaft 28 is given by:

(number of rotation of the gear wheel 21 of the power-     (2)

output shaft) = (number of rotation of the speed-reduction gear wheel 18) × (1 − 1/e)

Assume that the main shaft 3, and hence its gear wheel 17 rotates N1 turns. Then, the speed-reduction gear wheel 18 will rotate $N1 \times Z1/Z2$ turns. From Equation (2) the number of rotation of the gear wheel 21 of the power-output shaft 28 will be equal to $N1 \times Z1/Z2 \times (1-1/e)$, and the number N2 of rotation of the gear wheel 22 of the sub-shaft 12 will be given by:

$$N2 = N1 \times Z1/N2 \times (1 - 1/e) \times Z3/Z4 \quad (3)$$

As is apparent from Equation (1), $Z1/Z2 \times (1-1/e) \times Z3/Z4$ is equal to 1. Therefore, N2 is equal to N1. Thus, there will be no difference between the main and sub-shafts 3 and 12 in rotation.

Then, assume that the power-input shaft 22 is rotated "m" turns while the main shaft 3 is kept stationary. Then, the sub-shaft 12 rotates $m \times (-\frac{1}{5}) \times Z3/Z4$ turns through the agency of the gear reduction unit 19.

From the above, the relation between the number of rotations N1 of the main shaft 3 and the number of rotations N2 of the sub-shaft 12 will be given by:

$$N2 = N1 + m \times (1 - 1/e) \times Z3/Z4 \quad (4)$$

Some numerical examples are given in the following:

In case that the speed-reduction ratio 1/e is equal to −1/5, the following tooth numbers will satisfy Equation (1):

Z1=36; Z2=54; Z3=50; Z4=40; Z5=12; Z6=24; and Z7=60.

The number of rotations of the speed-reduction gear wheel 18 will be equal to Z1/Z2 (36/57=2/3). From Equation (2) the number of rotations of the gear wheel 21 of the power-output shaft 20 can be calculated as $2/3 \times (1 + 1/5) \times 50/40 = 1$.

Assume that the power-input shaft 20 of the gear reduction unit 19 rotates 5 turns. Then, each intermediate gear wheel 26 will rotate in the opposite direction, and the number of rotations is determined as follows:

$$5 \times Z5/Z6 = 5 \times \tfrac{1}{2}$$

Then, the inner-toothed gear ring 27 will rotate in the opposite direction, and the number of rotations of the inner-toothed gear ring is determined as follows:

$$Z6/Z7 \times 5 \times Z5/Z6 = 24/60 \times 5 \times \tfrac{1}{2} = 1$$

Thus, the gear wheel 21 of the power-output shaft 28 will rotate one turn together with the inner-toothed ring 27.

From Equation (3) the number of rotations of the gear wheel 22 of the sub-shaft 12 will be determined as follows:

$$N2 = 50/40 \times (24/60 \times 5 \times \tfrac{1}{2}) = 5/4$$

Therefore, when the power-input shaft 20 rotates one turn, the gear wheel 22 of the sub-shaft 12 rotates one fourth turn.

When the main shaft 3 and the power-input shaft 20 rotate one turn at the same time, the gear wheel 22 of the sub-shaft 12 rotates 5/4 turns, as is determined by:

$$N2 = N1 + m \times \tfrac{1}{4} = 1 + \tfrac{1}{4} = 5/4$$

When the gear wheel 18 of the speed-reduction unit 19 rotates one turn with the power-input shaft 20 kept stationary, as mentioned above, the gear wheel 21 of the power-output shaft 28 rotates $(1+Z5/Z7)$ turns. When the numbers of tooth of the gear wheels $20a$ and 27 are put in place of Z5 and Z7, it will be $(1+12/60)=6/5$. Thus, the speed will increase only by one fifth. The tooth numbers of different gear wheels should be determined to satisfy Equation 1, as for instance follows;

$$Z1 = 36 \times 2 = 72$$

$$Z2 = 54 \times 2 = 108$$

As may be understood from the above, a relative rotation transmitting apparatus according to the present invention uses a speed-reduction gearing arrangement as a kind of differential gear, thereby providing a dual function of speed reduction and differential-gear function. Accordingly, the relative rotation transmitting apparatus is simple in structure, permitting an inner sub-shaft and an outer coaxial main shaft to rotate at a selected ratio for feeding a tool carrier at a controlled speed, which is determined from the rotating speed of the sub-shaft. The apparatus has no part rotating at a multiplied speed, and therefore even if the main shaft rotates at an increased speed, the apparatus can endure well. Since the rotation of the power-input shaft of the speed-reduction unit is reduced and transmitted to the sub-shaft, the precision with which a tool is fed, is improved, and advantageously a small power drive may be used for driving the tool.

A relative rotation transmitting apparatus can be applied to a boring machine, a facing machine, an NC facing machine or any other machine using a cutting tool movable relative to a workpiece. Also, it can be applied to an arrangement for rotating two opposite rolls at a controlled ratio for instance, in a roll conveyor or in screwing bolts into a rotating body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A relative rotation transmitting apparatus comprising:
   a main shaft drive;
   a hollow main shaft connected to and driven by the main shaft drive, the main shaft having a gear wheel fixed thereto;
   a sub-shaft contained in the hollow space of the main shaft in coaxial relationship relative to each other, and having a gear wheel fixed thereto;
   a power-output shaft drive;
   a speed reduction unit having power-input and power-output shafts aligned with each other on the common axis, the power-output shaft being connected to the power-output shaft drive, and having a gear wheel fixed thereto, the speed reduction unit having a gear wheel rotatably fixed to a housing, and being rotatable about the common axis of the power-input and power-output shafts, and the gear wheel of the speed reduction unit housing meshing with the gear wheel of the main shaft, and the gear wheel of the power-output shaft meshing with the gear wheel of the sub-shaft;
   the tooth number $Z1$ of the main shaft gear wheel, the tooth number $Z2$ of the speed reduction unit gear wheel, the tooth number $Z3$ of the power-output shaft gear wheel, and the tooth number $Z4$ of the sub-shaft gear wheel being determined to satisfy the following equation:

$$Z1/Z2 \times (1 - 1/e) \times Z3/Z4 = 1,$$

where $1/e$ stands for the ratio of speed reduction, number of rotations of the power-output shaft/number of rotations of the power-input shaft.

2. A relative rotation transmitting apparatus according to claim 1, and further comprising:
   a tool-carrier fixed to the end of the sub-shaft, the tool-carrier having means for converting rotation about the longitudinal axis to rotation about an axis perpendicular to the longitudinal axis, and means for converting rotation about the perpendicular axis to a linear move, thereby permitting a tool to move perpendicular to the longitudinal axis when the sub-shaft rotates.

3. A relative roation transmitting apparatus according to claim 2 wherein the number of rotations $N2$ of the sub-shaft is given by:

$$N2 = N1 + m(-1/e) \times Z3/Z4,$$

where $N1$ stands for the number of rotations of the main shaft, and $m$ stands for the number of rotations of the power-output shaft drive.

* * * * *